United States Patent
Crona

(10) Patent No.: US 10,432,911 B2
(45) Date of Patent: Oct. 1, 2019

(54) METHOD FOR IDENTIFICATION OF CONTAMINATION UPON A LENS OF A STEREOSCOPIC CAMERA

(71) Applicant: Kapsch TrafficCom AB, Jönköping (SE)

(72) Inventor: Björn Crona, Jönköping (SE)

(73) Assignee: Kapsch TrafficCom AB, Jönköping (SE)

( * ) Notice: Subject to any disclaimer, the term of this patent is extended or adjusted under 35 U.S.C. 154(b) by 1241 days.

(21) Appl. No.: 14/321,691

(22) Filed: Jul. 1, 2014

(65) Prior Publication Data

US 2015/0009296 A1  Jan. 8, 2015

(30) Foreign Application Priority Data

Jul. 3, 2013  (EP) .................................... 13174967

(51) Int. Cl.
*H04N 13/00* (2018.01)
*H04N 13/239* (2018.01)
*G06T 7/00* (2017.01)
*H04N 13/246* (2018.01)

(52) U.S. Cl.
CPC ......... *H04N 13/239* (2018.05); *G06T 7/0002* (2013.01); *H04N 13/246* (2018.05); *G06T 2207/30168* (2013.01); *G06T 2207/30236* (2013.01); *H04N 2013/0074* (2013.01)

(58) Field of Classification Search
CPC ...... H04N 13/0239; G06T 2207/10028; G06T 2207/10016; G06T 2207/10021; G06T 2207/30088; G06T 2207/30248
USPC .......................................................... 348/47
See application file for complete search history.

(56) References Cited

U.S. PATENT DOCUMENTS

| | | | |
|---|---|---|---|
| 2009/0016636 A1 | 1/2009 | Kasashima et al. | |
| 2009/0213213 A1* | 8/2009 | Fright ................... | A61B 5/1077 348/77 |
| 2012/0013708 A1 | 1/2012 | Okubo | |
| 2012/0242665 A1 | 9/2012 | Peng | |
| 2013/0223673 A1* | 8/2013 | Davis ....................... | G06K 9/78 382/100 |

FOREIGN PATENT DOCUMENTS

| | | |
|---|---|---|
| EP | 1330132 A2 | 7/2013 |
| JP | 2010130549 A * | 6/2010 |

OTHER PUBLICATIONS

Extended European Search Report received for European Patent Application No. 13174967.3, dated Sep. 27, 2013, 5 pages.

* cited by examiner

Primary Examiner — Jamie J Atala
Assistant Examiner — Masum Billah
(74) Attorney, Agent, or Firm — Fiala & Weaver P.L.L.C.

(57) ABSTRACT

A method for identifying contamination upon a lens of a stereoscopic camera is disclosed. The stereoscopic camera is arranged such that it has the same capturing area over time, and is provided with a first camera providing first images of said capturing area and a second camera providing second images of said capturing area. The first and second images are divided into at least one evaluation area correspondently located in respective image. A traffic surveillance system is also disclosed where contamination upon a lens of a stereoscopic camera is identified according to said method.

15 Claims, 3 Drawing Sheets

METHOD FOR IDENTIFICATION OF CONTAMINATION UPON A LENS OF A STEREOSCOPIC CAMERA

CROSS-REFERENCE TO RELATED APPLICATION(S)

This application claims priority to European Patent Application No. EP 13174967.3, filed on Jul. 3, 2013, the entirety of which is incorporated by reference herein.

BACKGROUND

Technical Field

The present subject matter relates to a method for identifying contamination upon a lens of a stereoscopic camera. The subject matter further relates to a method for compensating for contamination upon a lens of said stereoscopic camera. Another aspect of the subject matter is a road surveillance facility utilizing a method for identifying contamination upon a lens of a stereoscopic camera. The subject matter is particularly advantageous in harsh environments, such as in close proximity of a busy road.

Background Art

Stereoscopic computer vision uses a stereoscopic camera, i.e. two slightly spaced apart cameras looking at the same area, to measure distances from the camera. Since the two cameras are spaced apart, they see the area from different angles and therefore render somewhat different images of the exposed area. The differences between the images from the two cameras can be used to calculate depth and distances. However, a stereoscopic system for measuring distances is highly vulnerable to contamination upon the camera lenses. A difference between the images caused by dirt may either be misinterpreted as a distance, or a distance may be overlooked or incorrectly measured due to the presence of contamination on the lenses. Despite this, stereoscopic systems sometimes operate in harsh environments where the camera lenses are exposed to contamination, e.g. in roadside systems, resulting in less functional systems.

EP 2 381 416 A1 describes a method reconstructing optically occluded parts of an image captured by a stereoscopic camera. The idea is to use the redundancy of the stereo camera pair to reconstruct the distorted images. The method renders just one reconstructed image out of the pair of images from the stereoscopic camera, and hence the depth information is lost.

BRIEF SUMMARY

There is thus a need for a method that reduces the effects of the above mentioned disadvantages.

An object of the present subject matter is to provide a method for identifying contamination upon a lens of a stereoscopic camera. This object is achieved by the features of claim 1. Further advantages, such as a method for compensating an image for contamination upon a lens and the generation of a warning message at a predetermined level of contamination, are achieved by implementing one or several of the features of the dependent claims.

The subject matter concerns a method for identifying contamination upon a lens of a stereoscopic camera. The method relates to a stereoscopic camera arranged such that a capturing area of said stereoscopic camera is predefined, such that images from said stereoscopic camera have the same capturing area over time. For example, the capturing area may be a road section at a road toll facility, a road crossing, or a road tunnel. The stereoscopic camera is provided with a first camera adapted to cover said capturing area by providing first images of said capturing area and with a second camera adapted to cover said capturing area by providing second images of said capturing area. The first and second cameras are adjusted relative to each other so that they both have a specific plane within the capturing area at a common height. This plane is normally the plane of the supervised road. Said first images are divided into at least one evaluation area and said second images are divided into at least one evaluation area, wherein the respective evaluation area of said first and said second images are correspondently located in respective image.

The method for identifying contamination upon a lens of the stereoscopic camera comprises the steps of:

forming historical image data for the evaluation areas, wherein said historical image data comprises an image parameter representing the respective evaluation area from a predetermined number of previously captured first and second images, comparing said historical image data for the evaluation area of said first image with historical image data for the evaluation area of said second image, and indicating that at least one lens of said stereoscopic camera is contaminated, if a deviation larger than a threshold value between the compared historical image data is identified.

For a stereoscopic camera that has a fixed position, the background usually looks the same over time. By comparing the behaviour between a certain evaluation area in a first image from the first camera and the evaluation area at the same position in the corresponding second image from the second camera, it can be identified if there is dirt upon one of the camera lenses. The reason for comparing historical image data collected from a number of previously captured images is to avoid misinterpreting temporary obstructions such as passing insects, passing vehicles, raindrops or snowflakes as lens contamination, whereby only obstructions that have stayed upon or close to the lens for a predetermined period of time should be identified as lens contamination. The image parameter comprised in the historical image data can be brightness, a colour channel, contrast or any other suitable image parameter. In order not to mistake small, normal variations between the first and second images as contamination, said deviation between the compared historical image data has to be larger than a threshold value before indicating at least one lens as contaminated.

The advantage of the described method is that contamination upon a lens of a stereoscopic camera automatically can be identified by the stereoscopic system itself. The advantage is accomplished through the use of the above described historical image data, which allows that only obstructions that have stayed upon or close to the lens are identified as lens contamination while temporary obstructions are ignored.

The method may further comprise the steps of:

identifying a minimum value and a maximum value of said image parameter from said historical image data for each evaluation area, calculating a first difference value between said minimum and said maximum value for each evaluation area, comparing said first difference value from the evaluation area of said first images with said first difference value from the evaluation area of said second images, and identifying the evaluation area of said first or second images associated with the lowest first difference value as obstructed by contamination on the lens.

For a contaminated evaluation area, the span of image parameter values is less than for a non-contaminated evaluation area. Hence, by calculating the difference between the maximum and minimum values of the image parameter from each evaluation area and comparing these differences, it is possible to determine if it is the evaluation area of the first image or the evaluation area of the second image that is obstructed by contamination on the camera lens.

When a new first and second image has been captured by said stereoscopic camera, the method may further comprise the steps of:

calculating an average value of said parameter of said historical image data for the respective evaluation areas of said first and second images, calculating a second difference value between said average values, adding said second difference value to the parameter value from the evaluation area of a newly taken image in which the evaluation area is identified as obstructed.

The effect of these further steps is to compensate for the obstruction caused by the contamination on the camera lens. In a normal case, without any contamination on the lens, the image parameter value should reasonably agree for two corresponding evaluation areas in the first and second images. However, when one of the evaluation areas is obstructed by contamination on the camera lens, its image parameter values are distorted. The purpose of the above steps is to restore the distorted image parameter value by bringing it closer to the image parameter value of the corresponding, unobstructed evaluation area in the other image. This is done by comparing the average value of the image parameter between the first and second images and compensating the obstructed evaluation area with this difference. The advantage of this compensation is that stereoscopic functions such as measurements of distances still work despite lens contamination. Hence, the need for cleaning the stereoscopic camera lenses is reduced. The interval between cleaning can be extended, while still retaining reliable measurement results up to cleaning.

The method works also for small, entirely opaque spots of contamination. Since the cameras lenses are not in focus when the first and second cameras capture their respective images, opaque spots on the lenses will not cause entirely black obstructions in the image but rather obstructions that are partially transparent and thus contain some information about the object hidden by the obstruction. Hence, it is possible to compensate for the opaque contamination and reveal the initially obstructed parts of the image.

In one example embodiment, the historical image data is represented by an average value of the image parameter. However, the individual image parameter values, especially the minimum and maximum values, are still kept in the memory of the electronic control unit that controls the stereoscopic camera. Storing the individual image parameter values enables continuous or stepwise updating of the historical image data. In another example embodiment, the historical image data is represented by a histogram of the image parameter. The histogram may either have a separate class for each possible value of image parameter, or it may have classes for bundles of values of the image parameter. A histogram with a separate class for each image parameter value enables sophisticated compensation of obstructed evaluation areas. Histograms with classes for bundles of image parameter values allow a lesser extent of sophisticated compensation, but require less computational power and storage memory.

If a histogram is used for representing the historical image data, a normal value may be defined as the most frequent image parameter value for the evaluation area of respective first and second images, and the method may further comprises the step of adjusting the histogram of the evaluation area identified as obstructed such that its shape and position corresponds to the histogram of its corresponding evaluation area in the other image. The normal value, being defined as the most frequent image parameter value, corresponds to the highest peak in the histogram. In a normal case, without any contamination on the lens, the image parameter histograms should substantially correspond for two corresponding evaluation areas in the first and second images. Adjusting the histogram of the obstructed evaluation area as to resemble the corresponding unobstructed evaluation area compensates for the dispersion caused by the obstruction. Important in the adjustment of the histogram of the obstructed evaluation area is to bring its highest peak to the same position as in the histogram of the unobstructed evaluation area. This can be done by calculating a third difference value between the normal values of the unobstructed and the obstructed evaluation areas. The third difference value is then added to all image parameter values in the historical image data of the obstructed evaluation area, resulting in its entire histogram being moved so that its highest peak is brought to the same position as the highest peak in the histogram of the unobstructed evaluation area. Said third difference value can also be added to the image parameter value of the obstructed evaluation area of a newly captured image, in order to compensate for the obstruction.

The purpose of adjusting an obstructed histogram is to define an adjusted value for each image parameter value comprised in the histogram. The adjustment is then used at each exposure for compensating the image parameter value of the obstructed evaluation area. Preferably, the adjustment of the histogram of an obstructed evaluation area is updated at regular intervals.

The histogram of an obstructed evaluation area is normally more squeezed, i.e. the historical image data comprises a narrower range of image parameter values, than the histogram of an unobstructed evaluation area. Another way of adjusting the obstructed histogram is thus by stretching the curve while ensuring that its highest peak ends up in the same position as the highest peak of the unobstructed histogram. This can be done for example by using the following algorithm:

$$f(x)=C(1-(x-A)/(B-A))+D((x-A)/(B-A)).$$

Here, x is the image parameter value of the obstructed evaluation area, A denotes the minimum value in the obstructed histogram and B is the image parameter value of the highest peak in the obstructed histogram. C is the minimum value in the unobstructed histogram and D is the image parameter value of the highest peak in the unobstructed histogram. However, if x is greater than the image parameter value of the highest peak in the obstructed histogram, then A is the image parameter value of the highest peak in the obstructed histogram, B is the maximum value in the obstructed histogram, C is the image parameter of the highest peak in the unobstructed histogram, and D is the maximum value in the unobstructed histogram.

The image parameter used in the identification of lens contamination is selected among the following parameters: brightness, colour channel, contrast or any other image parameter.

The first and second images may be divided into a plurality of correspondent evaluation areas. Dividing the images into a plurality of correspondent evaluation areas increases the resolution of the method. Normally, camera lenses in a roadside system get unevenly contaminated, for example by small dirt splashes. A small splash of dirt on the lens does not affect the entire image, but only the small area of the image formed by light that has passed through the dirty portion of the lens. By dividing the images into a plurality of evaluation areas, it is therefore possible to identify small splashes of dirt and to adapt the compensation of different parts of the image based on if they originate from a dirty or a clean portion of the lens.

Each evaluation area may be defined as an individual pixel, a bundle of pixels or any combination of several pixels in the respective first and second image. An individual pixel is the smallest element in a digital image. Using individual pixels as evaluation areas thus gives the best resolution and accuracy of the method—contamination can be identified and compensated for at the individual pixel level. Evaluation areas composed of bundles or combinations of several pixels reduces the need for processing capacity and storage space, but renders less resolution and accuracy in the lens contamination identification and compensation process. The bundling or combinations of pixels have to be done in the same way in both the first and second images such that each evaluation area has its counterpart in the other image. A further alternative is to calculate and use subpixels, i.e. areas even smaller than individual pixels, as evaluation areas.

The historical image data may be collected from a predetermined number of previously captured images, e.g., in the range of 100 to 5000 images. Collecting the historical image data from a large number of previously captured images eliminates the risk of identifying passing objects, e.g. a passing vehicle, a flying insect or a falling raindrop, as lens contamination. Still, the number of previous images from which historical image data is collected must also be limited, since a too large number would require an excessive amount of memory for storing the historical data and an excessive amount of computational power for performing operations on the historical image data.

The historical image data may be continuously updated. By continuously updating the historical image data, it is adapted to the prevailing ambient conditions. For example, a splash of dirt on the lens may affect the image differently in bright midday sunlight than in the weak light of dusk on a cloudy day. Hence, adapting the historical image data to prevailing conditions results in improved compensation for lens contamination.

The historical image data may be updated at predetermined time intervals by replacing the image parameter value from the oldest previously captured image by the corresponding image parameter value from a newly captured image. In this way, the historical image data is successively updated. For example, if collected from 1000 previous images and updated every second, the historical image data reflects the past 1000 seconds, that is approximately 17 minutes. Updating one value of the historical image data about once a second provides a good balance between reflecting a fair amount of time in the historical image data while limiting the amount of data. Updating the historical image data at time intervals substantially shorter than one second increases the undesired influence of temporary objects such as passing vehicles. However, if said time intervals are substantially longer than one second, the updating process becomes too slow for correctly reflecting the movements of shadows cast by stationary objects. In combination with collecting the historical image data from a large number of previous images, long time intervals also results in that it takes long time before new contaminations are discovered. It is up to the skilled person to select the number of previously captured images from which historical image data is collected and the update rate based on the working environment of the stereoscopic camera, for example traffic situation, vehicle speed, and weather.

The disclosed method may further comprise the step of generating a warning message when at least one lens of said stereoscopic camera is identified to have reached a predetermined level of contamination. The predetermined level of contamination may for example be a specific percentage of the total number of evaluation areas in the images from the camera being defined as obstructed by contamination upon the lens, or a certain number of neighbouring evaluation areas being defined as obstructed by contamination upon the lens. The predetermined level of contamination may also include a degree of obstruction of the evaluation area. The degree of obstruction is indicated by the deviation between the first difference values of two corresponding evaluation areas in the first and second images—the greater the deviation, the higher degree of obstruction. If the degree of obstruction is low, then a larger number of evaluation areas may be allowed to be defined as obstructed by contamination before a warning message is generated. Automatically generated warning messages reduce the need for manual inspection of the camera lenses, whereby time as well as money is saved. Automatically generated warning messages also reduce the risk of unknowingly relying on distance measurements from a stereoscopic camera that is too dirty in order to function properly.

The disclosure also concerns a traffic surveillance facility provided with a stereoscopic camera and an electronic control unit, wherein identification of contamination upon a lens of the stereoscopic camera is carried out according to the method described above. The inventive method is adapted to be integrated in or complement to the electronic control unit which conducts other appropriate image processing of the images from the stereoscopic camera. The traffic surveillance facility may be for example a road toll facility, surveillance of a tunnel, or a law enforcement system. Traffic surveillance facilities are roadside systems, and hence heavily exposed to contamination, such as splashes of dirty water or dust particles and grains, from the passing traffic. Using the above method for identification of contamination upon the stereoscopic camera lenses reduces the need for cleaning and/or manually inspecting the camera lenses while also achieving improved distance measurements from the stereoscopic images.

BRIEF DESCRIPTION OF THE DRAWINGS/FIGURES

In the detailed description of the invention given below reference is made to the following schematic figures, in which:

FIG. 1 shows a schematic overview of the set up of a stereoscopic camera.

FIGS. 2a-b show a first and a second image divided into evaluation areas.

DETAILED DESCRIPTION

Figure 1:
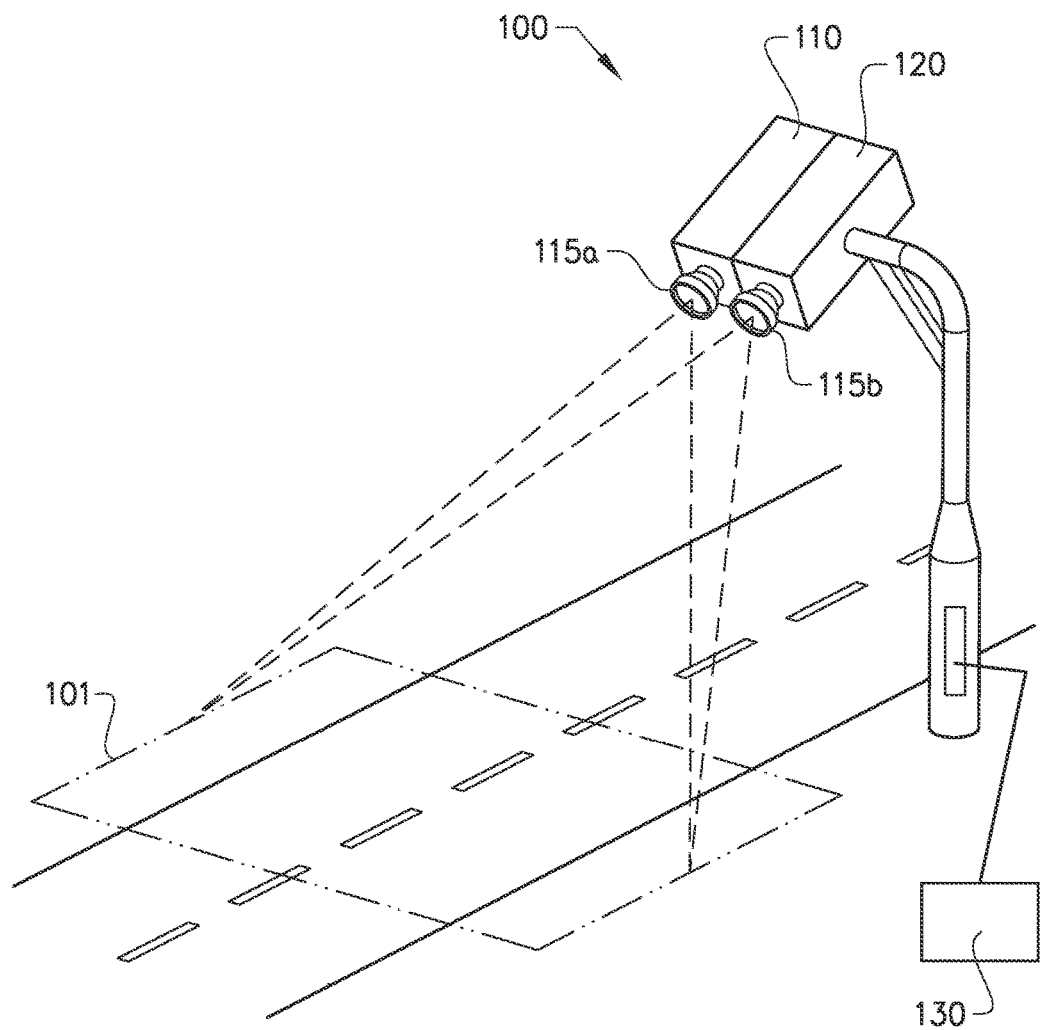

Various aspects of the present subject matter will hereinafter be described in conjunction with the appended drawings to illustrate but not to limit the present subject matter. In the drawings, one embodiment is shown and described, simply by way of illustration of one mode of carrying out the present subject matter. In the drawings, like designations denote like elements. Variations of the different aspects are not restricted to the specifically shown embodiment, but are applicable on other variations of the present subject matter.

FIG. 1 shows a schematic overview of an example of a set up of a stereoscopic camera 100 next to a road. The stereoscopic camera may for example be part of a traffic surveillance system, such as a road toll facility or a law enforcement system. The stereoscopic camera 100 comprises two cameras, a first camera 110 and a second camera 120 which in this example are placed next to each other such that their respective lenses 115a, 115b are slightly spaced apart. In other example embodiments, the cameras 110, 120 and thus their lenses 115a, 115b could be significantly spaced apart. Both the first camera 110 and the second camera 120 cover the same capturing area 101. Since the two cameras 110, 120 are spaced apart, they see the capturing area 101 from slightly different angles and therefore render somewhat different images of the capturing area 101. An electronic control unit 130 controls the stereoscopic camera 100 and is provided with image processing means enabling it to analyse the captured images. The differences between first images 210 (in FIG. 2a described below) from the first camera and second images 220 (in FIG. 2b described below) from the second camera 120 can be used to calculate distances. However, distance measurements are very vulnerable to contamination upon the camera lenses 115. A difference between the images 210, 220 caused by dirt may either be misinterpreted as a distance, or a distance may be overlooked or incorrectly measured due to the presence of contamination on the lenses 115. In order to avoid such problems, the present application discloses a method for automatically identifying contamination upon a lens 115 as well as compensating for the contamination such that distances calculated from the first and second images 210, 220 still are reliable even when a lens 115 is contaminated.

Figure 2A:
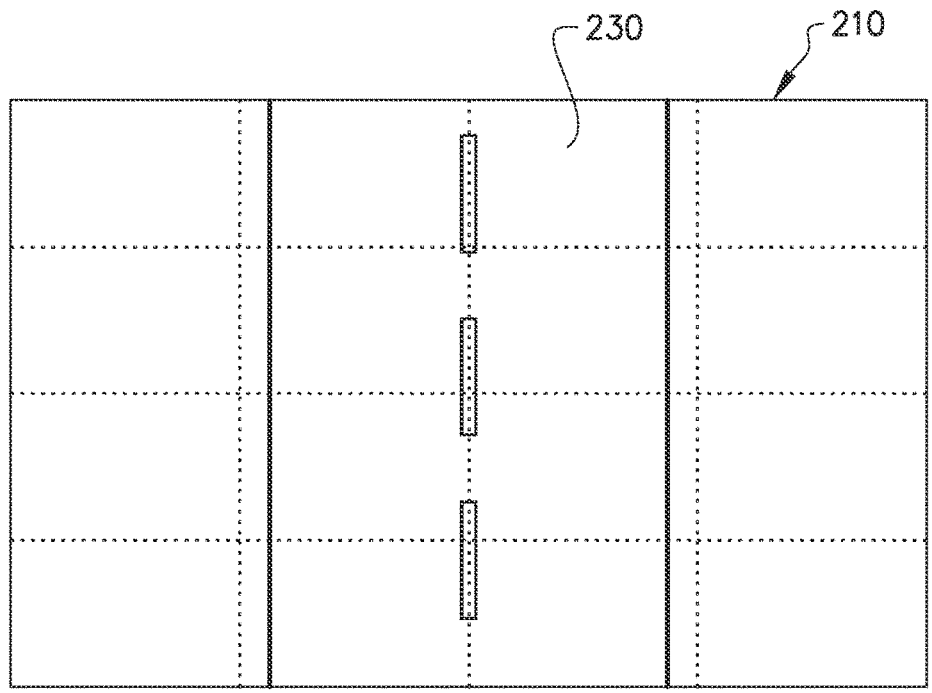
Figure 2B:
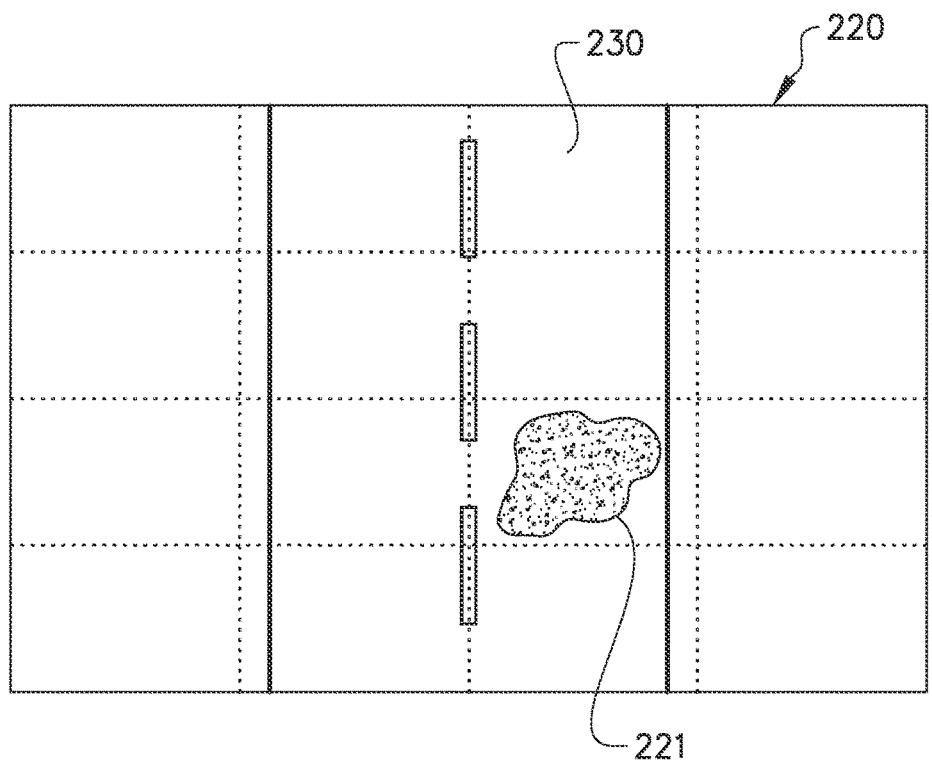

FIG. 2a shows a schematic example of a first image 210 from the first camera 110 and FIG. 2b shows a second image 220 from the second camera 120. The first and second images 210, 220 show the same scene, in this example a roadway, but the second image 220 has an obstruction 221 caused by contamination upon the lens 115b of the second camera 120. The first and second images 110, 120 are divided into an equal number of evaluation areas 230, such that each evaluation area 230 in the first image 110 has a corresponding evaluation area 230 in the second image 120. In this example, there are sixteen evaluation areas 230 in each image, but each pixel may, for example, form an individual evaluation area 230 in order to achieve high resolution in the identification of and compensation for lens 115 contamination. However, to reduce the need for processing capacity and storage space, several pixels could also be bundled to form a larger evaluation area 230. However, the bundling has to be done in the same way in both the first and second images 110, 120 such that each evaluation area 230 has its exact counterpart in the other image.

Figure 3A:
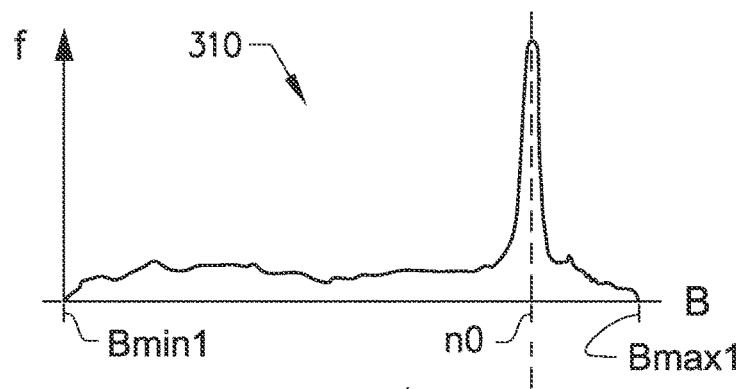
FIG. 3a shows a brightness histogram from a clean evaluation area.

FIG. 3a shows a schematic example of a histogram 310 of historical image data for a clean evaluation area, that is, an evaluation area which represents an image portion that has been captured through a non-contaminated part of the lens. From here on, the term clean evaluation area will refer to an evaluation area which is not obstructed by lens contamination as explained above. In this example, the image is a grey scale image and the parameter comprised in the historical image data is brightness B. The historical image data is collected from a predefined number of previously captured images, e.g. in the order of thousand images. The histogram 310 represents the frequency f of different brightness B values as a function of the brightness B. In this context, frequency f should be interpreted as the number of occurrences of a brightness value in the historical image data. The curve has a minimum value Bmin1 and a maximum value Bmax1 close to the end points of the range of possible brightness values. A usual range of brightness values is from 0 to 255, where 0 represent no brightness at all, i.e. black, and 255 represents full brightness, i.e. white. Values in between 0 and 255 represent different shades of grey. The histogram 310 has a distinctive peak at a normal value n0. This normal value is defined as the most frequently occurring brightness B value in the historical image data. Hence, n0 is the most probable "true" brightness value for the evaluation area.

Figure 3B:
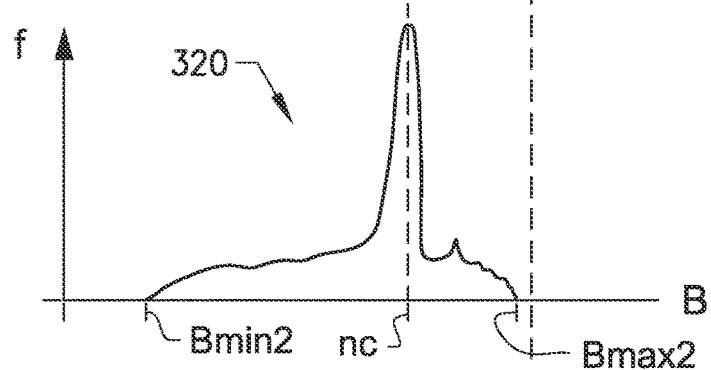
FIG. 3b shows a brightness histogram from an obstructed evaluation area.

FIG. 3b shows a schematic example of a histogram 320 of historical image data for an obstructed evaluation area corresponding to the clean evaluation area of FIG. 3a. The evaluation area being obstructed means that the evaluation area represents an image portion that has been captured through a contaminated part of the lens. From here on, the term obstructed evaluation area will refer to an evaluation area which is obstructed by lens contamination as explained above. As in the previous figure, the image parameter is brightness B and the f-axis represents the occurrence frequency. However, the brightness of the captured image is distorted by the presence of lens contamination. This can be seen by comparing the histograms 320 of the obstructed evaluation area with the histogram 310 of its corresponding clean evaluation area. The obstructed histogram 320 has a shorter span between its minimum value Bmin2 and maximum value Bmax2 and its normal value nc is displaced towards lower brightness values compared to the histogram 310 representing a corresponding clean evaluation area. The histogram 320 being squeezed and the distinctive peak being displaced towards lower brightness values are typical features of an obstructed evaluation area emanating from a contaminated lens portion. However, in exceptional circumstances, i.e. for specific types of contaminations in combination with certain light conditions, the distinctive peak and hence the normal value nc may instead be displaced towards higher brightness values due to distortion. But the span between the minimum and maximum values Bmin2, Bmax2 is always shorter for a contaminated evaluation area compared to a corresponding clean evaluation area. If there is a deviation between the historical image data for two corresponding evaluation areas, i.e. one in the first image and the other in the second image, it can be concluded that a lens of the stereoscopic camera is contaminated. In order to determine if the contamination is on the lens 115a of the first camera 110 or on the lens 115b of the second camera 120, the span of brightness values are compared. The evaluation area with the shortest span between its minimum brightness value and its maximum brightness value is contaminated.

Figure 3C:
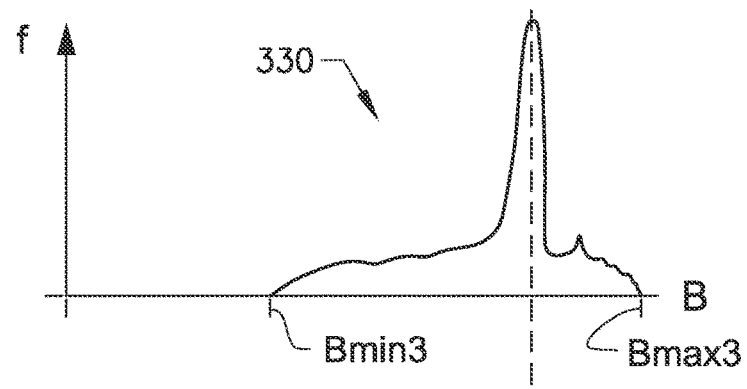
FIG. 3c shows a brightness histogram from an obstructed evaluation area compensated through displacement.

FIG. 3c shows a brightness histogram 330 from an obstructed evaluation area compensated through displacement. In order to restore the distorted brightness of an obstructed evaluation area, its histogram 320 can be adjusted to more closely resemble the histogram 310 of the clean evaluation area. One possible adjustment is to bring the distinctive peak to the same position, i.e. to the brightness value n0. This is done by calculating the difference between the clean normal value $n_0$ and the contaminated normal value nc. This difference is added to all brightness values in the historical image data of the obstructed evaluation area, resulting in its histogram 320 being displaced a distance n0−nc (i.e. n0 minus nc). The distinctive peak of the displaced histogram 330 coincides with the normal value n0 of the histogram 310 belonging to the corresponding clean evaluation area. However, the span between the maximum value Bmax3 and minimum value Bmin3 of the compensated histogram 330 is unchanged compared to the uncompensated histogram 320, and the maximum and minimum values Bmax3, Bmin3 hence do not coincide with the maximum and minimum values Bmax1, Bmin1 of the clean histogram 310.

Figure 3D:
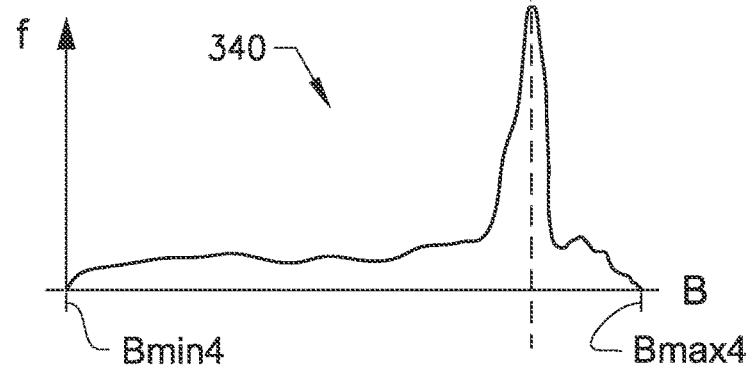
FIG. 3d shows a brightness histogram from an obstructed evaluation area compensated through stretching.

FIG. 3d shows a brightness histogram 340 from an obstructed evaluation area compensated through stretching. Here, the obstructed histogram 320 has been stretched such that its new maximum and minimum values Bmax4, Bmin4 coincides with the maximum and minimum values Bmax1, Bmax1 of the unobstructed histogram 310 while ensuring that the distinctive peak ends up in the same position n0 as the distinctive peak of the unobstructed histogram 310. This can be achieved for example via the following algorithm:

For obstructed brightness values B smaller than or equal to nc, $$f(B)=Bmin1(1-(B-Bmin2)/(nc-Bmin2))+n0((B-Bmin2)/(nc-Bmin2)),$$

and for obstructed brightness values B larger than nc, $$f(B)=n0(1-(B-nc)/(Bmax2-nc))+Bmax1((B-nc)/(Bmax2-nc)).$$

This is the same algorithm as described in the summary, but adapted to the denotations of FIGS. 3a-d.

Stretching the histogram, instead of just displacing it, results in better compensation of the lower range of image parameter values.

CONCLUSION

The invention is capable of modification in various obvious respects, all without departing from the scope of the appended claims. Accordingly, the drawings and the description thereto are to be regarded as illustrative in nature, and not restrictive.

Reference signs mentioned in the claims should not be seen as limiting the extent of the matter protected by the claims, and their sole function is to make the claims easier to understand.

What is claimed is:

1. A method for identifying contamination upon a lens of a stereoscopic camera, wherein said stereoscopic camera
   is arranged such that a capturing area of said stereoscopic camera is predefined such that images from said stereoscopic camera have the same capturing area over time,
   is provided with a first camera adapted to cover said capturing area by providing first images of said capturing area, and
   is provided with a second camera adapted to cover said capturing area by providing second images of said capturing area, wherein
   said first images are divided into at least one evaluation area and said second images are divided into at least one evaluation area, wherein the respective evaluation area of said first and said second images are correspondently located in respective image, wherein said method comprises the steps of:
   forming historical image data for said evaluation areas, wherein said historical image data comprises an image parameter representing the respective evaluation area from a predetermined number of previously captured first and second images,
   comparing said historical image data for the evaluation area of said first image with historical image data for the evaluation area of said second image, and
   indicating that at least one lens of said stereoscopic camera is contaminated, if a deviation larger than a threshold value between the compared historical image data is identified.

2. The method according to claim 1, wherein the method further comprises the steps of:
   identifying a minimum value (Bmin1, Bmin2) and a maximum value (Bmax1, Bmax2) of said image parameter from said historical image data for each evaluation area,
   calculating a first difference value between said minimum and said maximum value (Bmin1, Bmin2; Bmax1, Bmax2) for each evaluation area,
   comparing said first difference value from the evaluation area of said first images with said first difference value from the evaluation area of said second images, and
   identifying the evaluation area of said first or second images associated with the lowest first difference value as obstructed by contamination on the lens.

3. The method according to claim 2, wherein when a new first and second image has been captured by said stereoscopic camera, the method further comprises the steps of:
   calculating an average value of said parameter of said historical image data for the respective evaluation areas of said first and second images,
   calculating a second difference value between said average values, and
   adding said second difference value to the parameter value from the evaluation area of a newly taken image in which the evaluation area is identified as obstructed.

4. The method according to claim 1, wherein said historical image data is represented by an average value of said parameter.

5. The method according to claim 1, wherein said historical image data is represented by a histogram of said parameter.

6. The method according to claim 5, wherein the histogram has a separate class for each possible value of said parameter, or the histogram has classes for bundles of values of said parameter.

7. The method according to claim 5, wherein a normal value (n0, nc) is defined as the most frequent image parameter value for the evaluation area of respective first and second images, wherein the method further comprises the step of:
   adjusting the histogram of the evaluation area identified as obstructed such, that its shape and position corresponds to the histogram of its corresponding evaluation area.

8. The method according to claim 1, wherein said parameter is selected among the following parameters; brightness, colour channel, contrast or any other image parameter.

9. The method according to claim 1, wherein said first and second images are divided into a plurality of correspondent evaluation areas.

10. The method according to claim 9, wherein each evaluation area is defined as an individual pixel in the respective first and second image.

11. The method according to claim 1, wherein the historical image data is collected from a predetermined number of previously captured images.

12. The method according to claim 1, wherein the historical image data is continuously updated.

13. The method according to claim 12, wherein the historical image data is updated at predetermined time intervals by replacing the image parameter value from the oldest previously captured image by the corresponding image parameter value from a newly captured image.

14. The method according to claim 1, wherein the method further comprises the step of generating a warning message when at least one lens of said stereoscopic camera is identified to have reached a predetermined level of contamination.

15. A traffic surveillance facility, comprising:
   a stereoscopic camera, wherein said stereoscopic camera
      is arranged such that a capturing area of said stereoscopic camera is predefined such that images from said stereoscopic camera have the same capturing area over time,
      is provided with a first camera adapted to cover said capturing area by providing first images of said capturing area, and
      is provided with a second camera adapted to cover said capturing area by providing second images of said capturing area, wherein
      said first images are divided into at least one evaluation area and said second images are divided into at least one evaluation area, wherein the respective evaluation area of said first and said second images are correspondently located in respective image; and
   an electronic control unit provided to:
      control said stereoscopic camera; and
      perform an identification of contamination upon a lens of the stereoscopic camera, the electronic control unit configured to:
         form historical image data for said evaluation areas, wherein said historical image data comprises an image parameter representing the respective evaluation area from a predetermined number of previously captured first and second images,
         compare said historical image data for the evaluation area of said first image with historical image data for the evaluation area of said second image, and
         indicate that at least one lens of said stereoscopic camera is contaminated, if a deviation larger than a threshold value between the compared historical image data is identified.

* * * * *